Oct. 26, 1943.　　S. MENDELSOHN ET AL　　2,332,587
TESTING DEVICE FOR CAMERA SYNCHRONIZERS
Filed Dec. 27, 1940

INVENTORS
S. MENDELSOHN & P. K. McGALL
BY
ATTORNEY

Patented Oct. 26, 1943

2,332,587

UNITED STATES PATENT OFFICE 2,332,587

TESTING DEVICE FOR CAMERA SYNCHRONIZERS

Samuel Mendelsohn, Montclair, and Philip K. McGall, Orange, N. J.; said McGall assignor to said Mendelsohn Application December 27, 1940, Serial No. 371,892

7 Claims. (Cl. 88—14)

The present invention relates to a testing device for regulating the opening of a camera shutter so that the latter can be accurately timed with a camera synchronizer now commonly employed in the photographic art for causing complete opening of a camera shutter simultaneously with the moment of peak intensity from a photoflash lamp.

Heretofore it has been the usual practice for synchronizing apparatus to be set at the factory and when the apparatus gets out of adjustment due to severe usage, factory service is required to again test and re-adjust the synchronizer. This has not only been expensive but results in a photographer being without his complete equipment while awaiting re-adjustment service.

It is accordingly an object of the present invention to provide a synchronizer tester for accurately timing the operation of a camera shutter which can be readily employed by any camera dealer.

Another object of the present invention is the provision of a synchronizer tester for simply and quickly testing the opening of a camera shutter so as to make complete opening thereof coincide with the moment of peak intensity of a photoflash lamp.

A further object of the present invention is the provision of a synchronizer tester of simple and economical construction and which is exceptionally accurate in operation to synchronize the opening of a camera shutter with the moment of peak intensity of a photoflash lamp.

Figure 1:
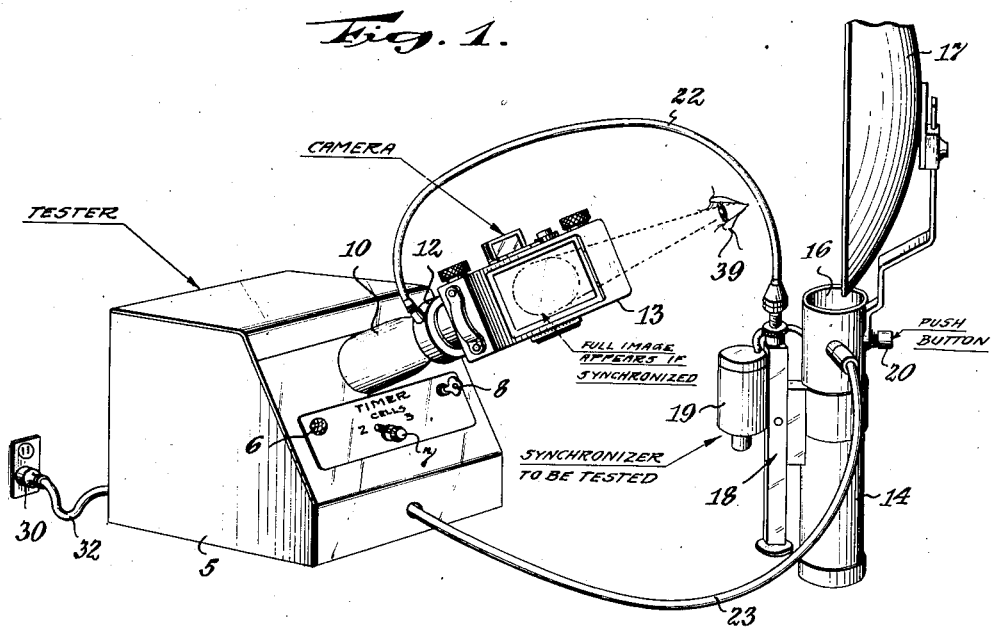
Figure 2:
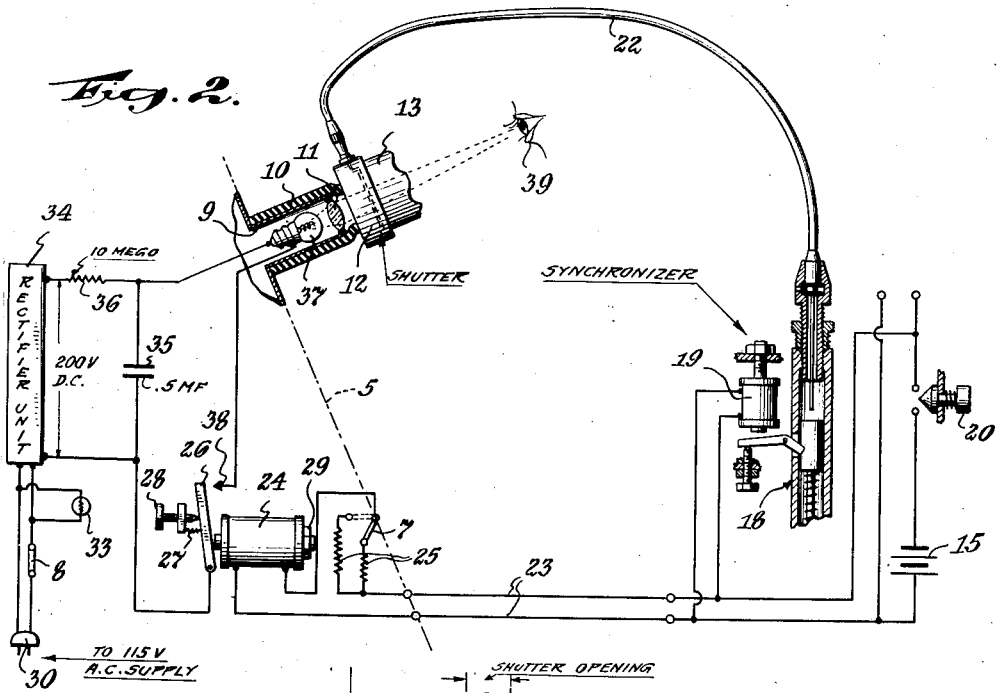
Figure 3:
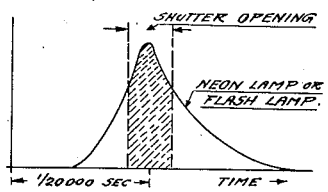

Still further objects of the present invention will become obvious to those skilled in the art by reference to the accompanying drawing, wherein:

Fig. 1 is a perspective view of the testing apparatus constructed in accordance with the present invention showing a camera and a synchronizer being in position to be tested by the apparatus;

Fig. 2 is a schematic illustration of the apparatus as shown in Fig. 1 and shows the electrical connections to the various elements of the testing apparatus, camera and synchronizer to be tested, and Fig. 3 is a graphic illustration of the intensity curve of a photoflash lamp wherein the ordinate represents intensity and the abscissa time in fractions of a second together with the opening of the camera shutter in relation thereto.

Referring now to the drawing in detail the testing apparatus, as shown in Fig. 1, comprises a cabinet 5 provided with a jewel bull's-eye 6 and a two position switch 7 on the sloping front wall of the cabinet. A key switch 8 is also provided on the front wall of the cabinet and must be inserted in the lock and moved to the unlocked "on" position to first condition the testing apparatus for operation.

An annular projection 9 is positioned perpendicular to the sloping front wall of the cabinet which is surrounded by a resilient collar 10 (Fig. 2) of yieldable rubber or the like, and a lens 11 is disposed interiorly of the projection 9 to form a window so that the camera shutter 12 of a camera 13 which is to be tested, may be pressed against the yieldable collar or window 10 thus keeping extraneous light from striking the camera shutter 12. The synchronizer to be timed with the camera shutter 12 may be of any type well known in the art but as shown in Fig. 1 is of the type described and claimed in Patent No. 2,204,424, issued June 11, 1940, to Samuel Mendelsohn, one of the co-inventors of the present invention.

Since the synchronizer per se forms no part of the present invention it is believed unnecessary that it be herein described in detail. It should suffice to say that it comprises a battery case 14 housing a pair of dry cell batteries 15 (Fig. 2) and provided with a socket 16 for receiving a photoflash lamp as well as a reflector 17 for directing the light from the lamp when ignited. Also fixed to the battery case is mechanism shown generally at 18 which is first "cocked" and held in this position by the armature of a solenoid 19 until the latter is energized by depression of a switch 20. Since the mechanism 18 is connected by a cable release 22 to the camera shutter 12 operation of the mechanism, upon energization of the solenoid 19 simultaneously with energization of the photoflash lamp (not shown), causes opening of the camera shutter 12.

By reference now more specifically to Fig. 2 it will be seen that when it is desired to employ the testing apparatus within the cabinet 5, it is connected by a cable 23 to the socket 16 of the synchronizer and is electrically substituted for the usual photoflash lamp in the synchronizer circuit. A time and load adjusting relay 24 is disposed within the cabinet 5, the winding of which is connected to the batteries 15 upon depression of the synchronizer switch 20 and one or the other of a pair of resistance elements 25 is connected in this circuit by the two position switch 7 depending upon whether the synchronizer to be tested is a two or three cell unit. The armature 26 of the relay 24 is biased in the open position by a coil spring 27 which maintains the armature against an adjustable stop 28. The relay 24 is regulated by this adjustable stop 28 and the adjustable relay core 29 to have the same characteristics as to time of ignition, duration of flash and ignition current as an average photoflash lamp.

The testing apparatus is connected to the usual source of commercial potential of 115 volts by means of a plug 30 and extension cord 32. Upon closure of the key switch 8 this source of supply is connected to a pilot light 33 disposed in back of the jewel bull's-eye 6 thus indicating to the operator that the testing apparatus is in condition for operation. At the same time the key switch 8 connects a rectifier unit shown generally at 34 to the domestic source of supply of 115 volts. This rectifier unit may be of any type well known in the art which converts the 115 volt A. C. source of supply into uni-directional current or direct current of 200 volts. One such unit comprises a transformer having a primary winding connected to the source of supply and a secondary winding designed to give the desired voltage of 200 volts which is connected through one or more rectifying valve tubes to the output or load.

The output of 200 volts D. C. from the rectifier unit 34, as shown in Fig. 2, is connected to a condenser 35 having a capacity of about .5 microfarad and a smoothing resistance 36 of approximately 10 megohms is connected in series with the D. C. source and the condenser. A gaseous discharge lamp, such as a small neon flasher lamp 37, is disposed in the annular projection 9 and is adapted to be connected to the condenser 35 by operation of the relay armature 26 which, together with a contact 38, operates as a switch upon energization of the winding of the relay 24 to complete a discharge circuit for the condenser through the lamp 37.

When it is desired to operate the testing apparatus to synchronize a camera shutter and a synchronizer, the testing apparatus is plugged into the synchronizer 18 by means of the cable 23 in place of a photoflash lamp and the camera 13 positioned against the window, as previously mentioned. The testing apparatus being connected to the source of supply of 115 volts and the switches 7 and 8 properly positioned, the pilot light 33 indicates that the tester is in condition for operation. In the "on" position of the switch 8 the rectifier unit charges the condenser 35 at a potential of 200 volts D. C.

The operator then depresses the synchronizer switch 20 thus simultaneously energizing the relay 19 as well as the relay 24 from the batteries 15. The relay 19 accordingly attracts its armature releasing the synchronizing mechanism which operates the cable release 22 with attendant opening of the camera shutter 12. At the same time the armature 26 of the relay 24 is attracted by the core 29 thus establishing engagement with the contact 38 completing a discharge circuit for the condenser 35 which momentarily flashes the lamp 37. The relay 24 is regulated, as before mentioned, by the adjustable stop pin 28 and adjustable core 29 so as to have the same characteristics as a standard photoflash lamp.

In other words all photoflash lamp manufacturers agree, that their lamps reach maximum intensity in $1/20000$ of a second as shown by the graph in Fig. 3. Accordingly the relay 24 is regulated so that the lamp 37 will flash in this same period of time, namely, $1/20000$ of a second. At the instant of flashing of the lamp 37 the eye 39 of the operator is directed through the camera at the lens 11 and by observation can determine whether the shutter is completely open at the instant of the flash which is of sufficient observable duration. If, for example, the eye observes any configuration, such as a star shape, the operator knows that the shutter is not completely open at the moment of flash but he cannot determine whether the shutter is moving in its opening or closing direction.

It is then only necessary for the operator to adjust the synchronizing apparatus 18 to cause faster or slower opening of the shutter as required which is empirically determined by observation until no further configuration is observed but only a general blur of illumination. This indicates complete opening of the camera shutter at the time shown in Fig. 3 which thus coincides with the moment of peak intensity of a photoflash lamp. The synchronizer being then completely synchronized with the particular camera shutter 12 it is ready for return to the photographer.

It can thus be readily seen by those skilled in the art that a synchronizer tester is herein provided for accurately timing the opening of a camera shutter by a synchronizer which is simple in operation and economical to manufacture. Due to its simplicity it can be readily employed by every camera dealer or amateur photographer to rapidly adjust any synchronizer with any given type camera shutter within a very few moments.

Although one embodiment of the present invention has been shown and described it is to be understood that other modifications thereof may be made without departing from the spirit and scope of the appended claims.

What is claimed is:

1. A synchronizing tester for accurately adjusting a synchronizing device normally operable to cause complete opening of a given camera shutter simultaneously with the moment of peak intensity from a photoflash lamp, comprising a light source, means adapted to momentarily energize said source to produce illumination therefrom symbolic of the moment of peak intensity from a photoflash lamp, means adapted to be connected to the synchronizing device under test, and operable in response to operation thereof, for causing operation of said energizing means, said second mentioned means comprising time delay means for delaying the operation of said energizing means for a predetermined period of time following operation of said synchronizing device, said period of time corresponding to the time required for a photoflash lamp to reach its peak intensity, the synchronizing device under test being operable to cause opening of the given camera shutter simultaneously with momentary illumination of said light source to enable an observer to view the latter through the open camera shutter and determine the adjustment necessary to the synchronizing device under test to cause it to completely open the given camera shutter at the instant of momentary illumination of said light source.

2. A synchronizing tester for accurately adjusting a synchronizing device normally operable to cause complete opening of a given camera shutter simultaneously with the moment of peak intensity from a photoflash lamp comprising a cabinet having a window and provided with a light source therein, means adapted to momentarily supply electrical energy to said light source to cause momentary illumination thereof symbolic of the moment of peak intensity of a photoflash lamp, means having a time delay corresponding to that required of a photoflash lamp in reaching its peak intensity adapted to be electrically connected to the synchronizing device under test and operable in response to operation of the latter to cause operation of said first mentioned means, and the synchronizing device under test being operable to cause opening of the given camera shutter simultaneously with momentary illumination of said light source to enable an observer to determine the adjustment necessary to the synchronizing device to make complete opening of the camera shutter coincide with the momentary illumination of said light source as seen through the given camera shutter and said window.

3. A synchronizing tester for accurately adjusting a synchronizing device normally operable to cause complete opening of a given camera shutter simultaneously with the moment of peak intensity from a photoflash lamp comprising a cabinet having a window and provided with a light source therein observable through said window, means in said cabinet adapted to be connected to a commercial supply source and adapted upon operation to cause momentary illumination of said light source symbolic of the moment of peak intensity of a photoflash lamp, a relay in said cabinet adjustable to give a time delay corresponding to that of a photoflash lamp in reaching the peak of its intensity, means adapted to be connected to the synchronizing device under test for supplying current to said relay in response to operation of said synchronizing device, an arm movable by said relay upon termination of the period of time delay, and means operable in response to movement of said arm for operating said first mentioned means to cause momentary illumination of said light source, and the synchronizing device under test being operable to cause opening of the given camera shutter simultaneously with momentary illumination of said light source to enable an observer to view said illumination through the opened camera shutter and determine the adjustment necessary to the synchronizing device under test to obtain complete opening of the camera shutter in synchronism with illumination of said light source.

4. A synchronizing tester for accurately adjusting a synchronizing device normally operable to cause complete opening of a given camera shutter simultaneously with the moment of peak intensity from a photoflash lamp comprising a cabinet having a window and provided with a gaseous discharge lamp therein observable through said window, a rectifier unit in said cabinet including energy storage means for momentarily supplying uni-directional electrical energy to said lamp upon connection of the latter to said unit to produce momentary illumination symbolic of the moment of peak intensity from a photoflash lamp, a relay in said cabinet adjustable to give a time delay corresponding to that of a photoflash lamp in reaching the peak of its intensity, means adapted to be connected to the synchronizing device under test for supplying current to said relay in response to operation of said synchronizing device, an arm movable by said relay upon termination of the period of time delay, and means operable in response to movement of said arm for connecting said rectifier unit to said lamp to cause momentary energization of the latter by said energy storage means, and said synchronizing device under test being operable to cause opening of the given camera shutter simultaneously with momentary illumination of said lamp to enable an observer to view said illumination through the opened camera shutter and determine the adjustment necessary to the synchronizing device under test to obtain complete opening of the camera shutter in synchronism with illumination of said lamp.

5. A testing device for determining complete opening of a given camera shutter at a preselected moment corresponding to the moment of peak intensity from a photoflash lamp comprising a lamp, a source of electrical energy operable to cause only momentary energization of said lamp symbolic of the moment of peak intensity of a photoflash lamp, means adapted to be connected to a shutter operating device and operable in response to actuation of said device to connect said source to said lamp to enable an observer to view the momentary flash of said lamp through the camera shutter under test to determine whether the latter is completely open at the instant of momentary illumination of said lamp, said connecting means comprising means for delaying operation thereof for a period of time corresponding to that required for a photoflash lamp to reach its peak intensity.

6. A testing device for determining complete opening of a given camera shutter at a preselected moment corresponding to the moment of peak intensity from a photoflash lamp comprising a lamp, a source of electrical energy adapted to be operably connected to said lamp to cause momentary illumination thereof symbolic of the moment of peak intensity of a photoflash lamp, means comprising a relay adapted to be connected to a shutter operating device and operable in response to actuation of said device, to connect said source to said lamp to enable an observer to view the momentary flash of said lamp through the camera shutter under test to determine whether the latter is completely open at the instant of momentary illumination of said lamp, said relay comprising means for delaying operation thereof for a period of time corresponding to that required by a photoflash lamp in reaching its peak intensity.

7. An apparatus to facilitate the adjustment of a synchronizing device comprising an adjustable relay for operating a camera shutter to completely open the camera shutter simultaneously with the flash of a test light comprising a circuit including said test light and a source of energy adapted upon closure of said circuit to cause only momentary illumination of said test light, means comprising a time delay relay operable to cause closure of said circuit after the lapse of a period of time corresponding to that required for the camera shutter to reach its fully open position, a second circuit including the winding of said time delay relay and having connections for including therein the relay on said synchronizing device for operating the camera shutter, means operable by an operator for closing said second circuit to cause energization of both said relays, the relay on said synchronizing device being adjustable to cause complete opening of the camera shutter simultaneously with closure of said first mentioned circuit and attendant momentarily illumination of said test light.

SAMUEL MENDELSOHN.
PHILIP K. McGALL.